(12) United States Patent
Leverne

(10) Patent No.: US 6,505,771 B1
(45) Date of Patent: Jan. 14, 2003

(54) METHOD, SYSTEM AND DEVICE FOR TRANSFERRING, BY ELECTROMAGNETIC LINKAGE, DATA BETWEEN READERS AND NOMADIC OBJECTS

(75) Inventor: Jean-Claude Leverne, Plaisir Cedex (FR)

(73) Assignee: Dassault AT, Plaisir Cedex (FR)

( * ) Notice: Subject to any disclaimer, the term of this patent is extended or adjusted under 35 U.S.C. 154(b) by 0 days.

(21) Appl. No.: 09/623,432

(22) PCT Filed: Mar. 11, 1999

(86) PCT No.: PCT/FR99/00548

§ 371 (c)(1),
(2), (4) Date: Nov. 17, 2000

(87) PCT Pub. No.: WO99/46722

PCT Pub. Date: Sep. 16, 1999

(30) Foreign Application Priority Data

Mar. 11, 1998 (FR) .............................. 98 03215

(51) Int. Cl.$^7$ .............................................. G06F 17/00
(52) U.S. Cl. ..................... 235/375; 235/382; 235/382.5; 340/141; 340/142
(58) Field of Search ................................. 235/375, 382, 235/382.5; 340/141, 142

(56) References Cited

U.S. PATENT DOCUMENTS 5,798,693 A * 8/1998 Engellenner ................. 235/385
5,986,550 A * 11/1999 Rapaport et al. ........... 235/380

FOREIGN PATENT DOCUMENTS

| EP | 282 992 | 9/1988 | |
|----|---------|--------|---|
| EP | 768 540 | 4/1997 | |
| FR | 2684783 A1 * | 6/1993 | ............ G06K/7/00 |

* cited by examiner

Primary Examiner—Michael G. Lee
Assistant Examiner—Seung Ho Lee
(74) Attorney, Agent, or Firm—Merchant & Gould P.C.

(57) ABSTRACT

The invention concerns methods, systems and devices for transferring, by electromagnetic linkage, data between universal readers and badges with different communication protocols. The universal reader searches for the nomadic objects by emitting a scanning signal of modulation modes. Each nomadic object, receiving the scanning signal, produces an echo signal, according to its own particular protocol. The universal reader analyzes each echo signal and deduces therefrom the specific protocol applied by the nomadic object. The universal reader inserts in universal reader inserts in conformity with the specific protocol, the messages to be transmitted in the reader frames interpretable by the nomadic object.

7 Claims, 3 Drawing Sheets

Figure 1:
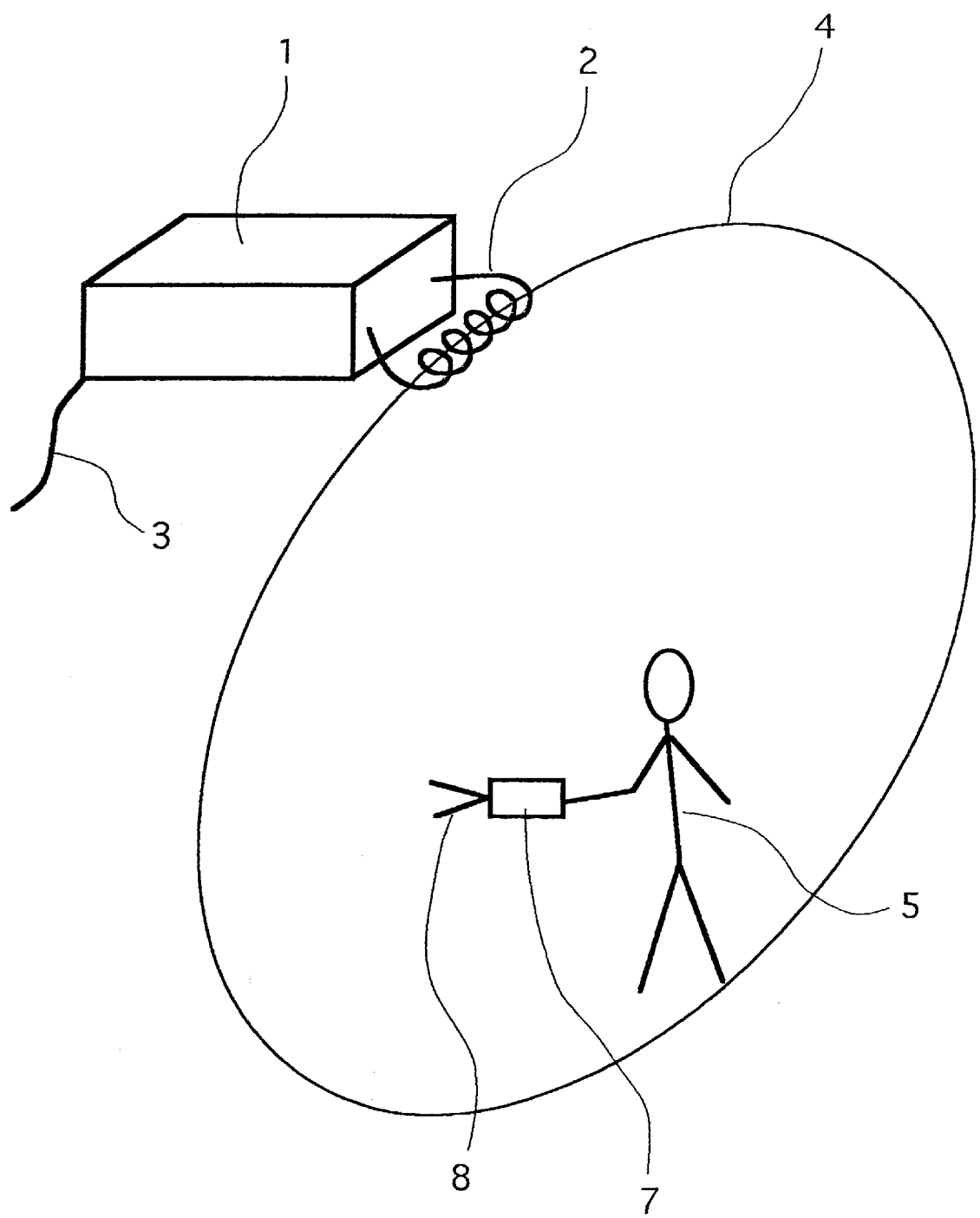

METHOD, SYSTEM AND DEVICE FOR TRANSFERRING, BY ELECTROMAGNETIC LINKAGE, DATA BETWEEN READERS AND NOMADIC OBJECTS

The present invention relates to the processes, systems and devices allowing the transfer, by close electromagnetic connection, of data between:

- on the one hand, a plurality of nomad objects (particularly cards or badges) with different technical feed characteristics and communication means, particularly different modulation methods and/or communication protocols, and
- on the other hand, readers.

By "nomad objects" is denoted in the following description any kind of portable data medium.

These processes, systems, devices and cards are commonly called "contactless".

The current "contactless" market is characterised by a very wide diversity in the contactless card offer reflecting a very wide diversity in the technology used. This diversity arises from the fact that there are several methods to effect remote power feeding of nomad objects and several methods for exchanging data with these objects.

The choice of technology impacts on the cost of the cards.

In this mobile context operators, particularly carriers, are being slow to accept "contactless" technology in preference to another since they are afraid of opting for the wrong "future standard". Moreover, the choice of a technology ties them in here and now to one type of card, a cabled logic card or a microprocessor card. In the one case, if they opt for cabled logic cards, they deprive themselves of the possibility of developing a teleticketing system compatible with electronic cash card functions. The choice of microprocessor cards on the other hand imposes on them a high card cost.

This diversity in technical solutions therefore creates a problem which needs solving. The financial implications of this are considerable. It would be desirable for carriers anxious to exploit "contactless" technologies to be able to implement an infrastructure of universal readers allowing them to process all types of contactless cards.

The adoption of an ISO standard could be a solution. There is in fact in existence a standardisation committee whose purpose is to standardise contactless cards. Nonetheless the work of this committee is advancing slowly, bearing in mind the divergent interests of industrialists. Furthermore, new technologies may be expected to appear on the market. These will be bound to interrupt this standardisation work. This is particularly the case for research being carried out on labels or on cards with a very short connection distance.

A description has also been given, particularly in patent application EP 0 768 540 A1, of a system including a reader which emits a variety of triggering signals corresponding to the different protocols for exchange with nomad objects. In other words, the reader emits the different protocols one after the other and fully runs the one which corresponds to the nomad object with which it is communicating. A reader of this kind provides at least a partial solution to the problem raised, however it does have disadvantages.

There has also been described, particularly in patent application EP 0 282 992 A2, a process consisting in attributing to each nomad object an identification code specific to the communication protocol which is specific to it. The nomad object transmits to the reader with which it is in communication the identification code of its protocol. The reader can then pursue the exchange by applying the protocol so identified. Such a process presupposes that a standardisation body has established the table of the different protocols used in nomad objects by allocating to each protocol a specific recognition code with a universal value for all economic operators.

A reader of this kind provides at least a partial solution to the problem raised. However it does have disadvantages. Indeed, such a process presupposes that a standardisation body has established the table of the different protocols used in nomad objects. This table has been established by allocating to each protocol a specific recognition code with a universal value for all economic operators.

The object of the present invention is to solve the problem raised and to avoid the use of a specific reader for each type of badge, without having furthermore the disadvantages of existing systems.

The process according to the invention allows the use of a single universal reader to read badges with different technical characteristics. The process according to the invention includes the following steps:

(a) the universal reader looks for the nomad objects which are in its field of detection by emitting a signal scanning the different modulation modes;

(b) the nomad object, receiving the scanning signal from the universal reader, produces an echo signal according to its own protocol, (c) the universal reader analyses said echo signal and deduces from it the specific protocol applied by the nomad object, (d) the universal reader inserts, in accordance with said specific protocol, the messages to be emitted into reader frames which can be interpreted by the nomad object concerned;

(e) the universal reader emits to the nomad object an electromagnetic signal modulated according to said reader frames.

In other words, the determination by the universal reader of the specific protocol of the nomad object under consideration is carried out in two phases. During a first phase, the universal reader sends a signal to scan the different modulation modes. This scanning signal induces a reaction on the part of the nomad object (the emission of an echo signal in accordance with the unknown protocol of the nomad object). In a second phase, the universal reader analyses the echo signal coming from the nomad object and deduces from it the protocol implemented by the nomad object. During the third phase, the universal reader pursues the exchange with the nomad object under consideration by applying the protocol thus determined.

The process according to the invention is therefore different from the process according to the prior art (EP 0 768 540 A1 or EP 0282 992 A2). This does not disclose a process in several phases comprising an analysis phase by the universal reader of output signals of the nomad object with a view to determining the protocol used by the latter.

Preferably, the process according to the invention further comprises the following steps:

(f) the nomad object inserts, in accordance with said specific protocol, the messages to be emitted into object frames (g) the nomad object modulates according to said object frames an electromagnetic signal;

(h) the universal reader demodulates said electromagnetic signal by extracting the messages inserted in said object frames;

(i) the universal reader decodes the messages inserted in the object frames according to a reverse method of that used by the nomad object concerned to generate the object frames.

To advantage, the nomad object receives by remote transmission the amount of energy which is deemed to be adequate to provide communication with the universal reader. It may also comprise an electric power source such as a cell or rechargeable battery.

Thanks to this combination of means, the nomad object can read the content of the output frames and can communicate to the universal reader the frames which are specific to it. The solution according to the invention thus has the advantage of allowing carrier operators to approach different card manufacturers and to set them in competition.

The present invention also concerns a system for transferring, by close electromagnetic connection, data between, on the one hand, a plurality of nomad objects with different technical feed characteristics and communication means, particularly different modulation methods and/or communication protocols, and, on the other hand, universal readers capable of being used whatever the characteristics of the nomad objects. Said system is such that:

(a) the universal reader comprises search means for searching for nomad objects which are in its field of detection; said search means emit a signal scanning different modulation modes;

(b) the nomad object comprises signal production means, said signal production means, activated by said modulation modes scanning signal, produce an echo signal in accordance with the specific protocol of the nomad object;

(c) the universal reader comprises analysis means for analysing said echo signal and deducing from it the specific protocol applied by the nomad object;

(d) the universal reader comprises insertion means for inserting, in accordance with said specific protocol, the messages to be emitted into reader frames which can be interpreted by the nomad object concerned;

(e) the universal reader comprises emission means for emitting to the nomad object an electromagnetic signal modulated according to said reader frames.

Preferably, the system according to the invention also comprises the following steps:

(f) the universal reader comprises insertion means for inserting, in accordance with said specific protocol, the messages to be emitted into object frames;

(g) the nomad object comprises modulation means for modulating according to said object frames an electromagnetic signal;

(h) the universal reader comprises demodulation means for demodulating said electromagnetic signal and comprises extraction means for extracting the messages inserted in said object frames;

(i) the universal reader comprises decoding means for decoding the messages inserted in the object frames according to a reverse method of that used by the nomad object concerned to generate the object frames.

The present invention also concerns a universal reader device intended to be used to exchange, by close electromagnetic connection, data with a plurality of nomad objects with different technical feed characteristics and communication means, particularly different modulation methods and/or communication protocols. Said universal reader device comprises:

(a) search means for searching for nomad objects which are in its field of detection; said search means emit a signal scanning different modulation modes; said scanning signal triggering the production by the nomad object of an echo signal in accordance with the specific protocol of the nomad object, (b) analysis means for analysing said echo signal and deducing from it the specific protocol applied by the nomad object, (c) insertion means for inserting, in accordance with said specific protocol, the messages to be emitted into reader frames which can be interpreted by the nomad object concerned, (d) emission means for emitting, to the nomad object, an electromagnetic signal modulated according to said reader frames.

Preferably, in the case where the nomad object comprises insertion means for inserting, in accordance with said specific protocol, the messages to be emitted into object frames and, modulation means for modulating, according to said object frames, an electromagnetic signal, the universal reader also comprises:

(e) demodulation means for demodulating said electromagnetic signal, (f) extraction means for extracting from the demodulated electromagnetic signal the messages inserted in said object frames, (g) decoding means for decoding the messages inserted in the object frames according to a reverse method of that used by the nomad object concerned to generate the object frames.

Figure 2:
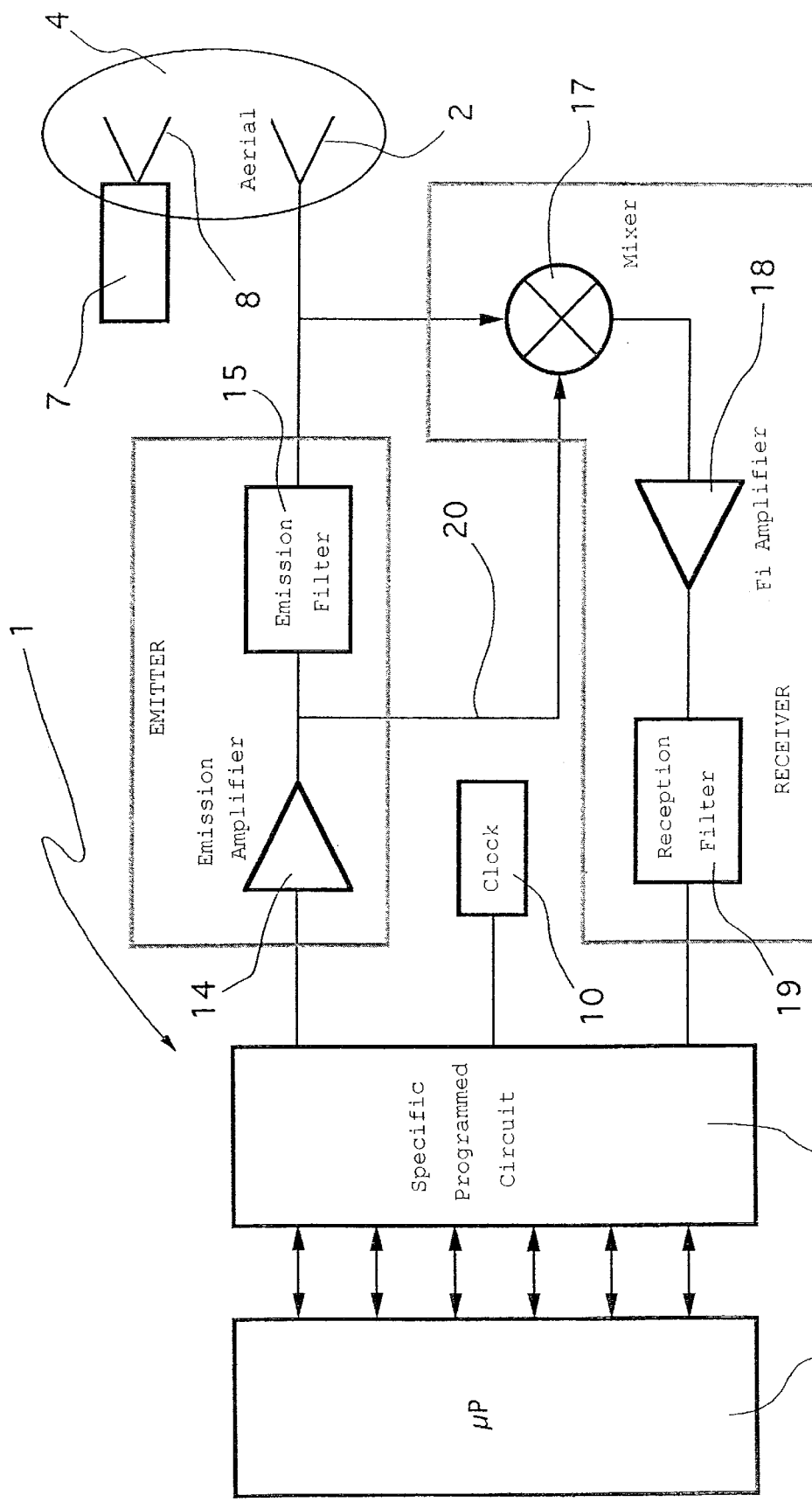
Figure 3:
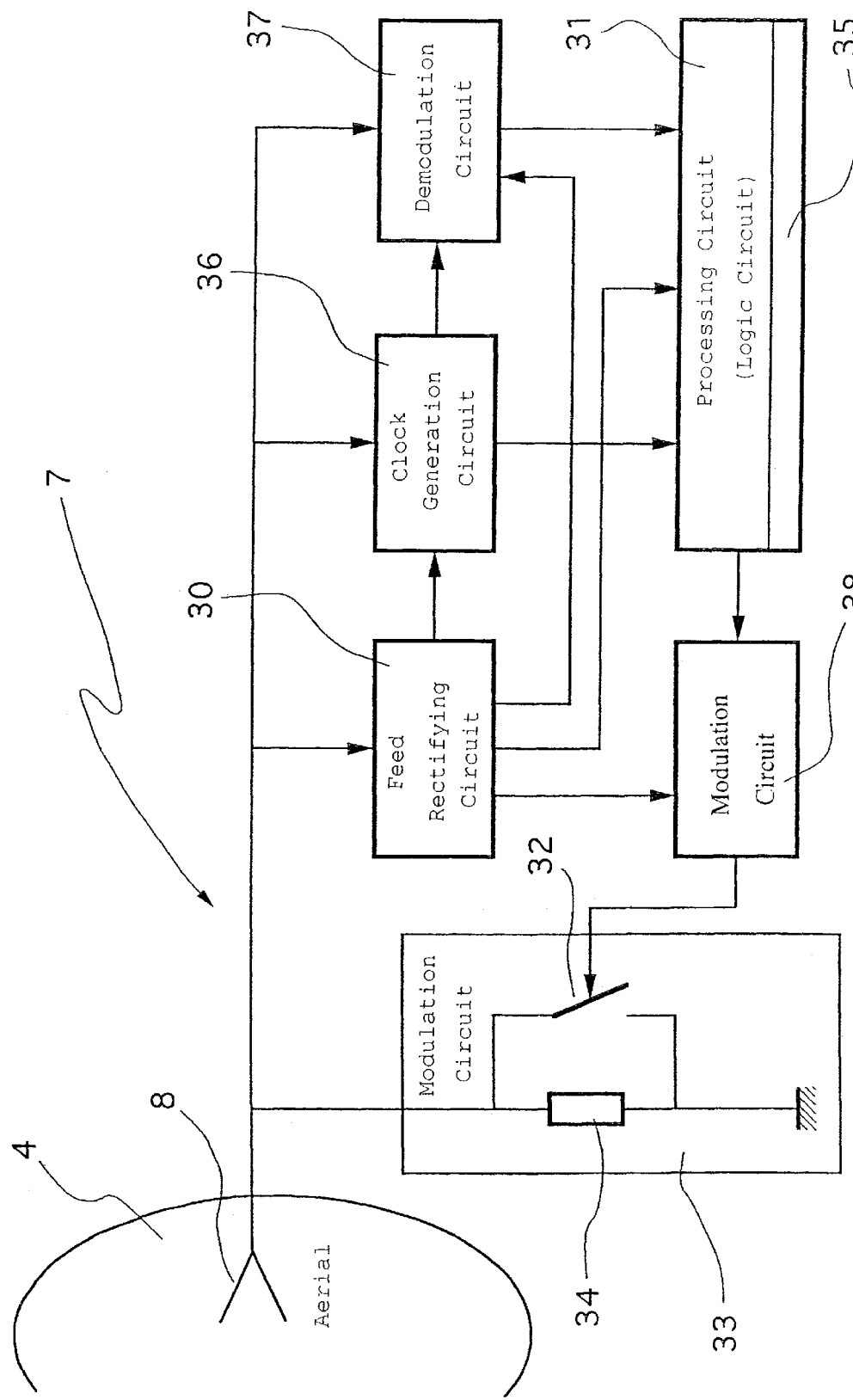

Other characteristics and advantages of the invention will emerge from reading the description of embodiment variants of the invention, given as an illustrative and non restrictive example, and:

FIG. 1 which shows a perspective view of an embodiment variant of the system according to the invention;

FIG. 2 which shows an embodiment variant of a universal reader device, in the form of a block diagram;

FIG. 3 which shows an embodiment variant of a badge, in the form of a block diagram;

A description will now be given by reference to FIGS. 1, 2 and 3 of how a universal reader 1 and a nomad object 7 can exchange data when the universal reader 1 has determined the communication protocol of the nomad object 7 concerned. There follows a description of how the universal reader 1 determines the communication protocol.

FIG. 1 shows a perspective view of an embodiment variant of the system according to the invention. It comprises at least one universal reader 1 and a plurality of nomad objects 7. A universal reader device 1 includes particularly an aerial 2. The universal reader device 1 is fed via a feed cable 3. It emits by means of the aerial 2 an electromagnetic detection or scanning field 4. A user 5 carrying a nomad object 7, penetrates the electromagnetic detection or scanning field 4.

It is noteworthy that the invention imposes no constraint in terms of the nature of the means allowing the nomad object 7 to be carried. The means allowing the nomad object 7 to be carried can be for example a bag, a purse, a supermarket trolley containing consumer goods on which the nomad objects are stuck, a freight container on a railway, etc.). Likewise, the nomad object 7 can be constituted, for example, by a badge, a watch, a label, a cabled logic card, a microprocessor card.

The operation of the universal reader is shown by the block diagram in FIG. 2. An oscillator supplies a reference frequency which acts as a clock 10 to the universal reader. From this clock 10, the Specific Programmable Circuit (FPGA) 11 manufactures (by multiplication, division, etc.) all the frequencies which the universal reader needs (particularly the emission frequency, etc.).

The messages to be transmitted from the universal reader 1 to the badge 7 are generated in a microprocessor 12 and inserted in the reader frames.

The reader frames are created either in the microprocessor 12, or in the Specific Programmable Circuit (FPGA) 11, by applying the previously determined communication protocol. A modulation signal is then generated in the Specific Programmable Circuit (FPGA) 11 from these reader frames. The Specific Programmable Circuit (FPGA) 11 transmits to the emission amplifier 14 the modulation signal and the emission signal. The emission amplifier 14 transfers the modulation signal to the emission signal. This transfer can also be carried out in the Specific Programmable Circuit (FPGA) 11. The emission amplifier 14 amplifies the resulting signal so that it attains a level which can be received and processed by the badge 7 present in the electromagnetic field 4. An emission filter 15 eliminates interference signals superimposed on the emission signal which might obstruct the communication between the universal reader 1 and the badge 7. The aerial 2 transmits, on the one hand, the emission signals from the universal reader 1 to a badge 7 and picks up, on the other hand, the modulations of the electromagnetic field 4 carrying the object frames produced by the badge 7 (as will be seen below).

A mixer 17 receives as input the signal modulated by the badge 7 and containing the object frames produced by the badge 7 in accordance with its specific protocol. To extract the modulation, the mixer transposes this signal to a lower frequency by using, via the connection 20, a part of the emission signal which it uses as a reference in the mixing operation. It is then possible, either to extract directly by demodulation the object frames produced by the badge, or to extract the sub-carrier which then contains the frames produced by the badge 7, by applying the previously determined protocol. In the case of a sub-carrier, the extraction of the object frames can be carried out by the Specific Programmable Circuit (FPGA) 11. The reception amplifier 18 amplifies the reception signals coming from the mixer 17 so that they reach a sufficient level and can be processed by the Specific Programmable Circuit (FPGA) 11.

A reception filter 19 eliminates interference signals which might obstruct reception. The Specific Programmable Circuit (FPGA) 11, or the microprocessor 12, extracts the messages from the object frames received. Thanks to the combination of means which have just been described, the universal reader 1 can demodulate the electromagnetic signal modulated by the communication means of the nomad object 7 and extract the object frames inserted by the nomad object 7 in the electromagnetic signal. Thanks to the combination of means described, the universal reader 1 can also decode the messages inserted in the object frames coming from the nomad object 7, by applying a reverse method of that used by the nomad object 7 to generate the object frames.

A description will now be given of FIG. 3 which shows an embodiment variant of the badge 7, in the form of a block diagram. The universal reader 1 emits, through its amplifier 14 and its aerial 2, an electromagnetic field 4. This field is picked up by the aerial 8 of the badge 7 present in the field of the universal reader 1. In the case of the embodiment variant described, a part of the signal received by the aerial 8 of the badge 7 is converted into energy by a rectifying and feed circuit 30 which supplies the energy necessary for the badge 7 to operate. A cell, or a rechargeable battery, could also be used to supply the requisite electrical energy. This rectifying and feed circuit 30 feeds the clock generation circuit 36, the modulation circuit 38, the demodulation circuit 37 and the processing circuit 31 otherwise known as the logic circuit. A clock generator circuit 36 generates, from the output signal of the universal reader 1, a frequency reference allowing the universal reader and the badge to operate consistently.

The messages contained in the reader frames emitted by the universal reader 1 and received by the aerial 8 of the badge 7 are extracted by the demodulation circuit 37 and processed by the logic circuit 31.

To produce the binary messages (object frames) which can be picked up by the aerial 2 of the universal reader 1, the badge 7 comprises communication means particularly a logic circuit 31 combined with a modulation circuit 38. The logic circuit 31 and the modulation circuit 38 of the badge 7 switch by means of electronic switches 32, according to a communication protocol and specific modulation methods, one of the elements of the aerial circuit 33 of the badge 7 (for example the load resistance or the tuning capacity 34 of the aerial 8). The behaviour of the aerial circuit 33 of the badge 7 can therefore vary between different states in accordance with the frame produced by the logic circuit. This change in behaviour of the badge 7 in the electromagnetic field 4 is detected by the universal reader 1. The universal reader 1 detects a variation in impedance in the terminals of its aerial 2 between different states which are in relation with the frame produced by the logic circuit 31 of the badge 7. This variation in impedance in the terminals of the aerial 2 of the universal reader 1 is expressed by a modulation of the frequency of the electrical signals, in accordance with the object frame produced by the logic circuit 31 of the badge 7. By demodulating the electrical signals as has just been described above with reference to FIG. 2, the object frames produced by the badge are extracted. The universal reader 1 is therefore in a position to interpret the binary messages produced by the badge 7.

The logic circuit 31 of the badge contains particularly a memory part 35. It is this memory part 35 which contains essential data such as the protocol rules, the badge identifier, the confidential codes, the access authorisations.

A description will now be given of how the universal reader 1 scans the different modulation modes of the nomad objects and determines the communication protocol of the nomad object under consideration.

The universal reader 1 seeks to establish a dialogue with the nomad object 7 which are in its detection field 4. To this end, it emits at regular intervals signals corresponding to the different known modulation modes.

A badge 7 present in the detection field 4 will react by emitting, in accordance with its own protocol, an echo signal (an echo object frame) if its modulation mode actually corresponds to the scanning signal it has picked up.

Processing this echo signal allows the universal reader 1 to identify the specificities of the nomad object 7 detected. This processing essentially includes a stage of identification in a database of the protocol corresponding to the echo signal received.

The characteristics of the electromagnetic output signal, particularly its frequency, its power and its modulations, will correspond to the characteristics of the specific electromagnetic signal awaited by the detected and identified nomad object 7. The universal reader 1 will then be able to insert into the output electromagnetic field 4 a reader frame in accordance with the communication protocol thus determined. This reader frame can be interpreted by the nomad object 7.

What is claimed is:

1. A process for transferring, by close electromagnetic connection, data between a plurality of nomad objects with different technical feed characteristics and communication means, particularly different modulation methods and/or communication protocols, and at least one universal reader adapted to be used whatever the characteristics of the nomad objects;

said process comprising at least one of the following steps:

said universal reader searches for said nomad objects which are in said universal reader's field of detection by emitting a signal scanning the different modulation modes, each nomad object, receiving the scanning signal from said universal reader produces an echo signal according to said nomad object's specific protocol, said universal reader analyses each echo signal and deduces thereon the specific protocol applied by an identified nomad object, said universal reader inserts, in accordance with said specific protocol, messages to be emitted into reader frames adapted to be interpreted by the identified nomad object;

said universal reader emits to the identified nomad object an electromagnetic signal modulated according to said reader frames.

2. A process according to claim 1 further comprising at least one of the following steps:

the identified nomad object inserts, in accordance with said specific protocol, the messages to be emitted into object frames, the identified nomad object modulates according to said object frames an electromagnetic signal, said universal reader demodulates said electromagnetic signal by extracting the messages inserted in said object frames;

said universal reader decodes the messages inserted in the object frames according to a reverse method of that used by the identified nomad object to generate the object frames.

3. A process according to claim 1 wherein the universal reader supplies, by remote transmission, to the nomad object energy required to provide communication with the universal reader.

4. A system for transferring, by close electromagnetic connection, data between, a plurality of nomad objects with different technical feed characteristics and communication means, particularly different modulation methods and/or communication protocols, and at least one universal reader adapted to be used whatever the characteristics of the nomad objects;

said system being such that:

said universal reader comprises search means for searching for nomad objects which are in said universal reader's field of detection; said search means emit a signal scanning the different modulation modes;

each nomad object comprises signals production means; said signals production means, activated by said modulation modes scanning signal, producing an echo signal in accordance with a specific protocol of a nomad object under consideration;

said universal reader comprises analysis means for analysing said echo signal and deducing therefrom the specific protocol applied by the nomad object under consideration;

said universal reader comprises insertion means for inserting, in accordance with said specific protocol, messages to be emitted into reader frames adapted to be interpreted by an identified nomad object;

said universal reader comprises emission means for emitting to the identified nomad object an electromagnetic signal modulated according to said reader frames.

5. A system according to claim 4 wherein:

the identified nomad object comprises insertion means for inserting, in accordance with said specific protocols, the messages to be emitted into object frames;

the identified nomad object comprises modulation means for modulating according to said object frames an electromagnetic signal;

said universal reader comprises demodulation means for demodulating said electromagnetic signal and comprises extraction means for extracting the messages inserted in said object frames;

said universal reader comprises decoding means for decoding the messages inserted in the object frames according to a reverse method of that used by the identified nomad object to generate the object fires.

6. A universal reader device for exchanging, by close electromagnetic connection data with a plurality of nomad objects with different technical feed characteristics and communication means, particularly different modulation methods and/or communication protocols;

said universal reader device comprises:

search means for searching for nomad objects which are in said universal reader's field of detection; said search means emitting a signal scanning the different modulation modes; said scanning signal trigger the production of an echo signal by a nomad object concerned, in accordance with a specific protocol of the nomad object concerned, analysis means for analysing said echo signal and deducing therefrom the specific protocol applied by the nomad object concerned, insertion means for inserting, in accordance with said specific protocol, messages to be emitted into reader frames adapted to be interpreted by an identified nomad object, emission means for emitting, to the identified nomad object, an electromagnetic signal modulated according to said reader frames.

7. A universal reader device for nomad objects comprising;

insertion means for inserting, in accordance with specific protocol, messages to be emitted into object frames and, modulation means for modulating according to said object frames an electromagnetic signal;

said universal reader comprises:

demodulation means for demodulating said electromagnetic signal, extraction means for extracting from the demodulated electromagnetic signal the messages inserted in said object frames, decoding means for decoding the messages inserted in the object frames according to a reverse method of that used by the identified nomad object to generate the object frames.

* * * * *